United States Patent [19]

Church

[11] 3,816,357

[45] June 11, 1974

[54] METHOD OF PREPARING AN ACRYLATE-POLYMER-MODIFIED CELLULOSE FIBER

[75] Inventor: John Armistead Church, Princeton Junction, N.J.

[73] Assignee: American Can Company, Greenwich, Conn.

[22] Filed: Dec. 3, 1971

[21] Appl. No.: 204,743

Related U.S. Application Data

[60] Continuation-in-part of Ser. No. 98,897, Dec. 16, 1970, abandoned, which is a division of Ser. No. 869,360, Oct. 24, 1969, Pat. No. 3,553,306.

[52] U.S. Cl. ..................... 260/2.2 R, 260/17.4 GC
[51] Int. Cl. ............................................ C08b 15/00
[58] Field of Search ..................... 260/2.1 E, 2.2 R

[56] References Cited
UNITED STATES PATENTS 3,083,118   3/1963   Bridgeford ............................ 117/47
3,457,198   7/1969   Sobolev ................................ 260/2.2
3,553,306   1/1971   Church ................................. 264/218

OTHER PUBLICATIONS

Livshits, Khim. Technol. Proizvod. Trelluvl. Pokl. Vses. Narch–Tekh. Sovesch, 2nd 1966 pp. 157–169.
Garbuz et al., Zh. Prikl. Spektroik 14, 449–453 (1971).

Primary Examiner—Melvin Goldstein
Attorney, Agent, or Firm—Robert P. Auber; Frank S. Charlton; George P. Ziehmer

[57] ABSTRACT

Acrylic and alkakacrylic acid can be graft copolymerized with cellulose fibers to form ion exchanging materials. The cellulose, acid monomer, and one component of an alkali persulfate-alkali thiosulfate redox catalyst coupled are mixed first. Then a strongly alkaline solution of the second catalyst component is added and the polymerization is permitted to continue to completion.

4 Claims, No Drawings

METHOD OF PREPARING AN ACRYLATE-POLYMER-MODIFIED CELLULOSE FIBER

BACKGROUND OF THE INVENTION

This application is a continuation-in-part of application Ser. No. 98,897, filed Dec. 16, 1970 and now abandoned, which is a division of application Ser. No. 869,360, filed Oct. 24, 1969 and issued Jan. 5, 1971 as U.S. Pat. No. 3,553,306.

According to the present invention, polymer-grafted cellulosic fibers having ion-exchange properties are prepared by grafting polymers of acrylic acid, an alkacrylic acid, or their respective metallic salts in and on the fibrous cellulose structure while the fibers are suspended in an aqueous medium. The resulting polymer-grafted fibers, having strong ion-exchange properties imparted thereto by virtue of the presence of the polyacrylate groupings, may then be transformed into films or filaments by means of the viscose process. Films and filaments obtained by the above process have exceptional ion-exchange properties which make them eminently suitable, among other things, for use in membrane separation processes such as ultrafiltration, electrodialysis and reverse osmosis. The physical and mechanical characteristics of the resultant film products also render them exceptionally well suited for the above separation processes, which are of prime importance in such fields as stream pollution abatement, water desalination, concentration of food products and in medical fields employing dialysis devices such as in artifical kidneys and the like.

It is known to graft polymerize a synthetic polymer onto a preformed cellophane film or rayon filament, but by the very nature of such processes the copolymer can only be grafted to the outer surfaces of the film or filament or in an otherwise non-uniform fashion, whereas according to the present invention, the films and fibers produced contain the grafted copolymer uniformly throughout the supermolecular structure thereof so that the overall effectiveness in the preparation of films for use in membrane separation processes is much greater. For a general discussion of the advantages which would be obtained if cellulose could be grafted with appropriate polymers before film and/or fiber production, see Z. A. Rogovin, "Chemical Modification of Cellulosic Man-Made Fibers," *Svensk Paperstidning* 70: 799–804 (1967), especially paragraph 5 on page 801. The present invention has succeeded for the first time in producing an extended form cellulose material from cellulose pregrafted with an ion-exchange polymer.

Films prepared by the viscose process from the polymer-grafted fibers of the present invention are less brittle than known ion-exchange films or membranes and are therefore less likely to crack during use. Also, the resultant films are not thermoplastic and may therefore be used in a warm environment. Further advantages of the product of the viscose reaction are its relative chemical inertness to dilute acids and alkalies, its water insolubility and its relatively high ion-exchange capacity. In the past, cellulosic membranes having a relatively high ion-exchange capacity were substantially water soluble so as to be of substantially no use in aqueous systems.

Generally, according to the present invention, a cellulosic material such as preferably cotton linters or wood pulp in an aqueous suspension is treated with a synthetic monomer which will, upon polymerization, produce a polymer having ion-exchange properties, some of which is grafted to the cellulosic material. After removal of the excess ungrafted polymer, the graft copolymers of cellulose may be subjected to the viscose process by treating with caustic soda, aging and treating with $CS_2$ to xanthate the swollen cellulosic graft copolymer material. After suitable mixing, the mixture may then be dissolved by further addition of caustic soda and aged. The solution may then be shaped into an extended form such as a fiber or filament or cast as a film or membrane and submerged in a regeneration solution of sodium sulfate and sulfuric acid to produce membranes or it may be forced through a spinneret into a regeneration solution to form filaments of cellulose graft polymers having ion-exchange properties.

It has been found that graft copolymers of cellulose may be prepared by treating the cellulosic material with alkali acrylate or alkali alkacrylate and graft polymerizing said compounds or a mixture thereof directly onto the cellulosic material, the presence of the carboxylate groups providing the desired ion-exchange characteristics in the final product. Although wood pulp may be used as the basic cellulosic material, it has been found that the use of cotton linters produces polymer-modified fibers which may be processed to obtain membranes having better physical characteristics because of the higher molecular weight of the cotton linters compared to wood pulp. In accordance with the concept of the present invention, the procedure for graft polymerizing the material having a high ion-exchange capacity on the cellulose fibers involves first treating the cellulose fibers in aqueous suspension with the desired polymerizable monomer together with one member of a particular two-member redox catalyst couple. The redox catalyst couple is comprised of two anionic inorganic salt members, a persulfate ion ($S_2O_8^=$) and a thiosulfate ion ($S_2O_3^=$), neither of which will undergo ion exchange with the active groupings on the cellulose molecule. After completion of the polymerization, the grafted fibers are washed substantially free of ungrafted polymer which may be present in the aqueous medium or loosely attached to the fiber surfaces. This ungrafted polymer manifests itself as a milkiness in the aqueous medium and the reaction product may be considered substantially free of ungrafted polymer when the wash water shows no trace of milkiness. After washing, the fibrous product may be subjected to a typical viscose reaction and regenerated as films or filaments.

The following is a specific example of a polymer grafting of cellulose according to this invention.

EXAMPLE I

An amount of air-dry spruce sulfite alpha-cellulose corresponding to 5.00 g. ovendry pulp was added to a 1,000-ml. reaction flask equipped with a thermometer, motor-driven gas dispersion stirrer and a vented addition funnel. The apparatus was flushed with nitrogen. In a separate operation, 10 ml. of water containing 0.040 g. of ammonium persulfate, $(NH_4)_2S_2O_8$, was added to 9.5 ml. (10.0g.) acrylic acid monomer and the mixture was then added slowly to the pulp in the reactor via the addition funnel, with blending by the stirrer. The addition of this mixture took 5 minutes and was conducted at 25° C. This procedure causes thorough absorption into the fibers of an intimate mixture of monomer and one component of the initiator system. Forty minutes later a mixture of 0.087 g. sodium thiosulfate pentahydrate, $Na_2S_2O_3.5H_2O$, and 190 ml. 6.58 N NaOH was added to the pulp in 2½ minutes. The pH of the resulting solution may be determined by computation to be about 14.5. The temperature immediately rose about 10° C. due to polymerization of the monomer. Twenty-seven minutes after commencement of the addition of the alkaline thiosulfate solution, the entire contents of the flask were poured into 1 gallon of water in a large Waring Blendor and blended to wash out any homopolymer. The pulp was filtered off and the washing was repeated twice more, the final wash being with hot water in which the dispersed pulp was allowed to stand 3 hours. The pulp was then filtered off and dried under vacuum. The weight of the dried product was 5.76 g. The weight increase of 0.76 grams was due to grafted poly (sodium acrylate). The fibers were converted to a film by the viscose process as follows: Four and one-half grams of fibers were treated for 5 minutes with 75 ml. of 18% NaOH and then filtered and pressed with a rubber membrane to five times their initial weight. The mass was picked apart, added to a glass jar and 2.5 ml. $CS_2$ was added. The jar was sealed and mechanically rotated for 3 hours; then the xanthated orange mass was brought into solution by the gradual addition of 70 ml. of 1.2N NaOH over a 2-hour period with agitation. The viscose solution was allowed to sit 65 hours, after which time a few undissolved lumps had settled out. Films were cast from the clear orange supernatant liquid on a glass plate and regenerated in a bath of 17% $Na_2SO_4$ — 5% $H_2SO_4$. The films were thoroughly washed in water and then plasticized in 5 percent glycerin. They were dried while stretched over the top of Buchner funnels and secured with rubber bands. The films were smooth and mechanically uniform.

Infrared spectra of these films showed strong absorption in both the carboxylic acid and carboxylate regions of the spectrum in direct contrast to similar films prepared from unmodified cellulose. Furthermore, the films prepared according to this invention exhibited substantial ion-exchange capacity due to the presence of the carboxylic acid-carboxylate groupings grafted on the cellulose fibers in the polymer-forming step described above.

The cellulose graft film copolymer prepared as in Example I has excellent ion-selective properties and can be used as a barrier between two ionic aqueous solutions and can be used in water desalination. Whenever desired, the acrylate polymer can be converted to the acid form, poly (acrylic acid) or to a different salt form such as poly (calcium acrylate). The use of polyvalent ions, such as calcium, will cross-link the polyacrylate chains so that a stiffening effect would be obtained, if desired.

It is to be further noted that the above procedure of Example 1 can be equally applied to the grafting of polymers of high ion-exchange capacity on cotton linters, and films made from such polymer-grafted cellulose fibers will be found to have even more desirable properties due to the higher molecular weight of cotton linter fibers as compared to wood pulp fibers.

In the polymer-formation step as carried out in Example I, above, it is important that the reactants be added to the aqueous cellulose fiber slurry in proper sequence in order to obtain the desired grafting of the polymer on the cellulose fiber. It is necessary that the reaction be carried out under conditions such that one anionic component of the two-component catalyst system (persulfate ion-thiosulfate ion) is thoroughly absorbed into the fiber substrate along with the polymerizable monomer before polymerization is initiated by the addition of the strongly alkaline solution containing the second component of the two component catalyst. For example, if the procedure set forth in the foregoing Example I is followed in detail, except that the ammonium persulfate is added not with the acrylic acid but instead is mixed into the alkaline thiosulfate solution, no graft polymerization occurs. In order for grafting to take place, one member of the catalyst couple (that is, either the persulfate salt or the thiosulfate salt) must be added with the monomer, or at least sufficiently prior to the addition of the second member of the catalyst couple to allow for absorption of monomer and the first catalyst member into the cellulose fiber structure. Otherwise, polymerization which does occur will be outside the fiber structure without true fiber grafting.

EXAMPLE II

The procedure of Example I was repeated with substantially more effective agitation of the contents of the reaction vessel, resulting in a greater polymer grafting of the pulp fibers. The filtration and washing was carried out as previously described except that methanol was added to the wash waters to assist in the removal of water from the highly hydrated polymer-grafted pulp. The poly (sodium acrylate) content of the product was 24.1 percent. Conversion of the polymer-grafted fibers to a film by means of the viscose process resulted in a product having strong ion-exchange properties.

A polymer-grafted fiber product having properties similar to those described above may be obtained by carrying out a comparable reaction using methacrylic acid, ethacrylic acid or other similar alkacrylic acid as the polymerizable monomer. Analysis of films prepared from the poly (sodium acrylate) grafted fibers and from the various poly (sodium alkacrylate) grafted fibers will show the presence of a large quantity of carboxyl groups chemically grafted to the cellulose substrate.

In carrying out the process of this invention, the two active components of the catalyst couple are the persulfate ion and the thiosulfate ion, respectively. These materials are preferably added as salts of ammonium or the alkali metals, and as previously mentioned, in order for graft polymerization to occur throughout the fibrous cellulose structure, it is necessary that one member (preferably the persulfate salt) of the catalyst couple be allowed to penetrate and be absorbed into the cellulose fiber with the polymerizable monomer before the addition of the second member (preferably the thiosulfate salt) of the couple.

I claim:

1. A method for forming a polymer-modified cellulosic material having ion-exchange properties comprising (1) suspending cellulose fibers in a solution comprising a mixture of water, a polymerizable monomer chosen from the group consisting of acrylic acid, alkacrylic acid and mixtures thereof, and one component of a two-component polymerization catalyst couple, consisting essentially of an alkali persulfate and an alkali thiosulfate and (2) subsequently adding thereto an aqueous solution containing caustic alkali and the other component of the said two-component polymerization catalyst couple, maintaining the resulting strongly alkaline reaction mixture to essential completion of the polymerization of said monomer and washing the resulting polymer-modified cellulosic fibers substantially free of ungrafted polymer.

2. A method according to claim 1 wherein said fibrous cellulose material is wood cellulose fibers and said polymerizable monomer is acrylic acid.

3. A method according to claim 1 wherein said fibrous cellulose material is cotton linters and said polymerizable monomer is acrylic acid.

4. A method according to claim 2 wherein said one catalyst component is ammonium persulfate and said other catalyst component is sodium thiosulfate.

* * * * *